United States Patent

Grieger

[11] Patent Number: 5,868,452
[45] Date of Patent: Feb. 9, 1999

[54] BENCH SEAT FOR MOTOR VEHICLES, IN PARTICULAR CAMPING CARS

[75] Inventor: Andreas Grieger, Kressbronn, Germany

[73] Assignee: Aquti Produktentwicklung & Design GmbH, Kressbronn, Germany

[21] Appl. No.: 557,160
[22] PCT Filed: May 18, 1994
[86] PCT No.: PCT/EP94/01607
 § 371 Date: Nov. 16, 1995
 § 102(e) Date: Nov. 16, 1995
[87] PCT Pub. No.: WO94/26553
 PCT Pub. Date: Nov. 24, 1994

[30] Foreign Application Priority Data

May 19, 1993 [DE] Germany .......................... 43 16 930.9

[51] Int. Cl.$^6$ ...................................................... B60N 2/00
[52] U.S. Cl. .................... 296/68.1; 280/808; 297/216.1; 297/452.39; 297/391
[58] Field of Search ...................... 296/68.1; 297/216.1, 297/216.12, 216.13, 232.391, 452.18, 452.2, 452.39, 484, 481; 280/808

[56] References Cited

U.S. PATENT DOCUMENTS

| 2,740,642 | 4/1956 | Atwood . |
| 2,833,554 | 5/1958 | Ricordi . |
| 2,891,804 | 6/1959 | Frayne et al. . |
| 3,451,719 | 6/1969 | de Lorean . |
| 3,762,505 | 10/1973 | Morse .................................. 296/68.1 X |
| 3,885,810 | 5/1975 | Chika . |
| 3,961,807 | 6/1976 | Maki et al. . |
| 4,350,369 | 9/1982 | Chika .................................. 280/808 X |
| 5,056,848 | 10/1991 | Fekete et al. .............................. 296/63 |
| 5,328,231 | 7/1994 | Raymond ............................. 297/232 X |
| 5,362,129 | 11/1994 | Itoh et al. ................................. 297/391 |
| 5,452,941 | 9/1995 | Halse et al. ......................... 297/483 X |

FOREIGN PATENT DOCUMENTS

| B 562352 | 4/1987 | Australia . |
| B 561233 | 7/1987 | Australia . |
| 0 511100 | 10/1992 | European Pat. Off. . |
| 2113579 | 10/1972 | Germany . |
| 2747398 | 5/1978 | Germany . |
| 7923386 | 8/1979 | Germany . |
| 8526894 | 1/1986 | Germany . |
| 3813557 | 11/1989 | Germany . |
| 3822461 | 1/1990 | Germany . |
| 4003941 | 8/1991 | Germany . |
| 9114531 | 2/1993 | Germany . |
| 9302831 | 6/1993 | Germany . |
| 9314859 | 2/1994 | Germany . |
| 2102743 | 2/1983 | United Kingdom . |

Primary Examiner—Dennis H. Pedder
Attorney, Agent, or Firm—Knobbe, Martens, Olson & Bear, LLP

[57] ABSTRACT

To improve the safety of seats for motor vehicles, in particular campings cars, in the event of an accident, at least one vertical column provided on the back rest of the seat has coupling points for two three-point safety belts at an upper end and a coupling flange at a lower end for connecting with one of the vehicle floor or chassis. The column forms a support portion of the seat. The flange may attached directly to a beam of the vehicle chassis.

17 Claims, 3 Drawing Sheets

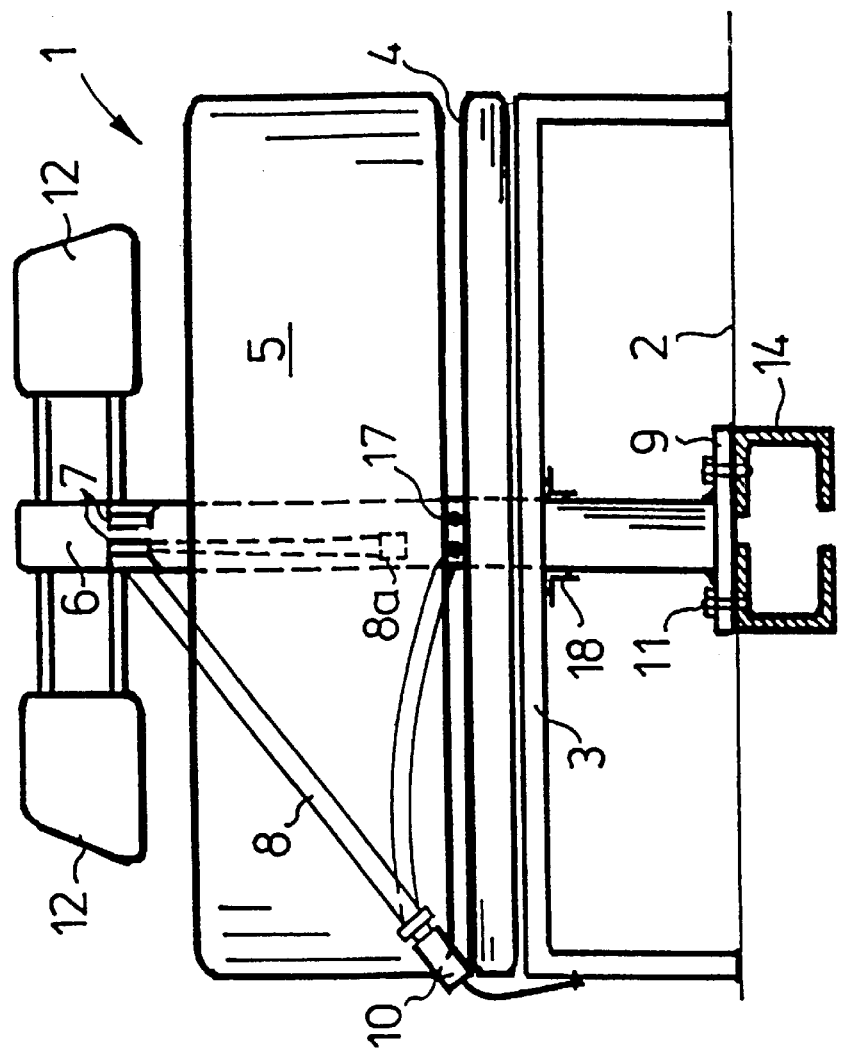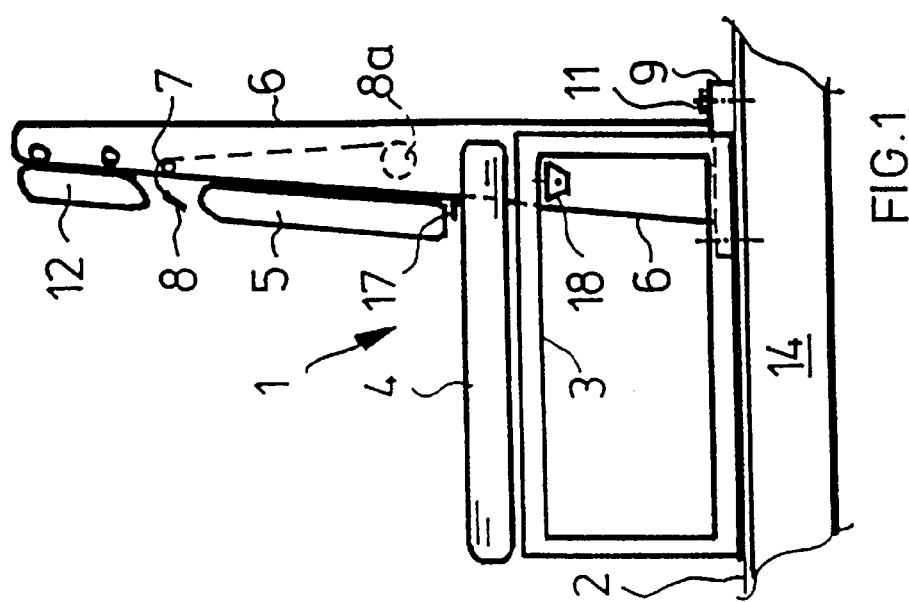

BENCH SEAT FOR MOTOR VEHICLES, IN PARTICULAR CAMPING CARS

FIELD OF THE INVENTION

The invention relates to a bench seat for motor vehicles, in particular camping cars consisting of a bench seat frame with seat and back rest for at least two persons, with the bench seat frame being arranged at the vehicle floor/chassis and comprising a holding device for both safety belts.

BACKGROUND OF THE INVENTION

At such bench seats for motor vehicles, in particular in the field of camping cars, lap belts are still often used as safety belts (two-point safety belts), though in the field of passenger cars the three-point safety belt long ago succeeded as the optimum retaining device. One reason is that the bench seat frames do not offer sufficient stability for an articulation of three-point safety belts, in particular with the top coupling point (return point of the belt). An articulation of the safety belts at the so-called B- or C-column of the vehicle body, as this is usual in the field of passenger cars, is out of question due to two reasons. Often, the bench seat is arranged in a spaced manner to a side panel of the vehicle body to create sufficient passages for the living space of the camping car. Thus, the top coupling point for the central seat position has to be guided for a long distance of about 1 m up to the next beam of the vehicle. The second reason is that in camping cars only plastic built-ons without a particular rigid structure of the body are often built up onto a vehicle chassis, such that in case of an articulation at these built-ons, the required security in case of an accident, in particular the tear resistance of the top return/coupling point is not appreciable. Also, the solution known from various vans, according to which the top coupling point of the safety belts is arranged at the ceiling (roof) is not practicable for camping cars, because a sufficient standing height and, thus, a great distance between bench seat and vehicle ceiling would be required.

DE 93 02 831 U1 discloses a bench seat comprising a vertical support being mounted on the floor portion of the vehicle chassis. In addition, this vertical support is laterally supported by the back rest and by a horizontally extending traverse. Moreover, only one safety belt is completely arranged at the bench seat frame whereas the top coupling point of the second safety belt is arranged at a side panel of the vehicle. Therefore, a rigid outer body is required which is in general not available with a camping car comprising a plastic body. Moreover, the arrangement of the bench seat is constructively defined by this and cannot be pushed away from the top belt coupling point of the outer seat, as this would be convenient for the production of camping cars with a variable and often differing bench seat arrangement.

DE 79 23 386 describes a single seat with triangularly arranged stiffening braces being articulated at the base portion of the seat.

DE 21 13 579 discloses a holding device for safety means, with steadying struts being directly mounted on the vehicle floor. However, this requires an additional cross-strut for anchoring at the lateral beams of the chassis.

From U.S. Pat. No. 2,740,642 and DE 27 47 398 there are known retaining systems with upright tubes behind both front seats, with the tubes being clamped between vehicle floor and vehicle ceiling for an additional fixing or being mounted by a wire rope. This requires a rigid structure of the ceiling which is in general not available with camping cars.

DE 91 14 531 deals with an anchoring frame for bench seats being stiffened by respective braces. However, conventional two-point (lap) belts are provided with this.

DE 40 03 941 relates to a safety belt arrangement for back seats with the top coupling point of the three-point safety belt being mounted on a steady component part behind the back seat unit.

U.S. Pat. No. 3,451,719 merely shows a bar for tightening lap belts extending crosswise behind a bench seat.

U.S. Pat. No. 2,833,554 describes a bounce safety system with a shielding plate being provided in front of the driver's chest and knees and being supported at a central bar which is mounted on the body ceiling and on the floor.

U.S. Pat. No. 2,891,804 refers to a support device of an obliquely extending two-point belt, with a column being mounted on the vehicle ceiling and an additional strut being inserted into the ceiling.

UK 2 102 743 deals with a holding device for wheelchair drivers in buses with the columnar bars being again braced between floor and ceiling.

SUMMARY OF THE INVENTION

Accordingly, it is an object of the invention to provide a bench seat for vehicles, in particular camping cars, offering the requirements for application of three-point belts and, therefore, an increased safety in case of accident as well as a simple and largely free-selectable fastening means in the vehicle.

This object is achieved by a bench seat consisting of a frame-like bench seat frame with seat and back rests for at least two persons being spaced apart from the vehicle floor, with the bench seat frame being arranged at the vehicle floor/chassis and comprising a holding device for two three-point safety belts, wherein at said back rest, at least one upright, freestanding column is provided. The column includes one top safety belt coupling point and a coupling flange at its lower end for connection with the vehicle floor/chassis wherein said column is a supporting component part of the bench seat frame.

The top safety belt coupling point for both safety belts of both seats may be arranged at this very rigidly-formed column by arrangement of an upright column at the back rest. Hereby, the required strength of the column, in particular flexural, torsional and buckling strength, is created by the direct linkage at the vehicle floor/vehicle chassis by means of a coupling flange such that in case of an accident the introduction of forces results directly into the vehicle chassis. Preferably, the coupling flange of the column is directly arranged above a longitudinal beam of the vehicle. According to this freestanding design, the column does not need a second fastening means at the body ceiling or at the side beams, such that the bench seat may be arranged at nearly any place on the floor group of the vehicle, in particular spaced apart from the side panels.

In a preferred embodiment only one single central, i.e. centrically arranged at the bench seat, column is provided of which the both top return/coupling points for both safety belts lead to outlying belt locks. In a preferred embodiment, the head rests may be arranged at this column, as well. However, it is also possible to provide two columns per bench seat at the outer side thereof, if the belt locks for the safety belt are to be positioned in the middle of the bench seat.

Furthermore, it is convenient when the bench seat upon which the seat is arranged, is mounted on the column, as well, in particular bolted. Hereby, a further stiffening of the bench seat structure is obtained. However, even the bench seat frame can be formed in that radially respectively basket-like extending diagonal struts are arranged from the lower area of the column, supporting the seat of the bench seat and forming holding devices for the belt locks. By this, it is possible that the entire bench seat group can be easily removed from the vehicle by releasing the coupling flange of the column. The coupling flange is preferably formed as a flange plate being directly positioned above the longitudinal beam of the vehicle and being releasable by means of bolted connections or other quick-lock fasteners such that several places for the assembly of the column and appertaining bench seat group may be chosen within the vehicle. This is in particular convenient in production, as the same type of bench seat may be used with different variants of the assembly.

Further preferred embodiments of the invention are subject of the subclaims.

Following, several embodiments will be explained and described by referring to the drawings.

BRIEF DESCRIPTION OF THE DRAWINGS

There is:

FIG. 1 a schematic side view of a bench seat for motor vehicles, in particular camping cars;

FIG. 2 a front view of the bench seat according to FIG. 1;

DESCRIPTION OF THE PREFERRED EMBODIMENTS

Figure 3:
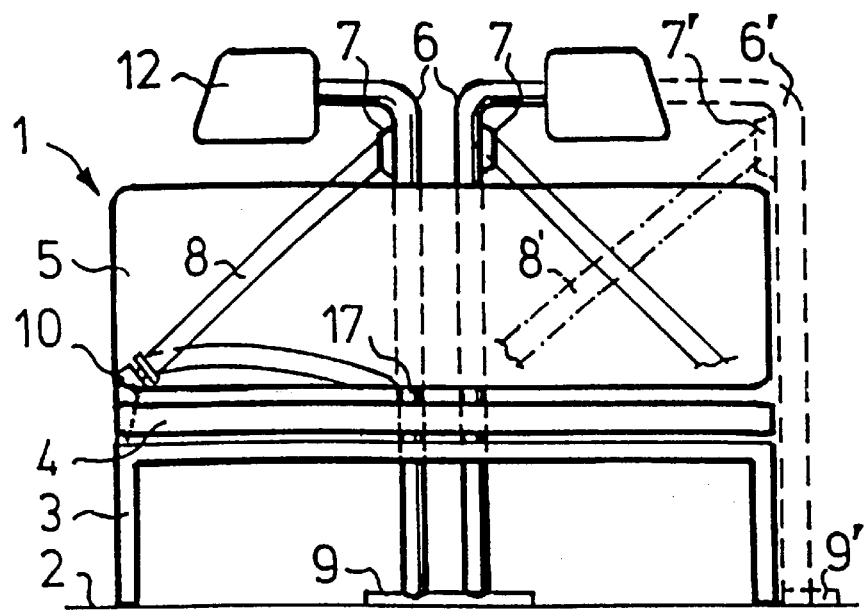
FIG. 3 a modified embodiment showing a tube-shaped formation of the bench seat column.

FIG. 1 shows a side view of a bench seat 1 being uprightly mounted on a vehicle floor 2. Essentially, the bench seat 1 consists of a bench seat frame 3, a seat 4 for two persons and a back rest 5, approximately equal in area and rectangularly joining thereon. The arrangement of an upright column 6 at the rear side of the back rest 5 is of essential importance, with a top coupling point 7 being provided at each top end of the column 6 (see also FIG. 2). Hereby, "coupling point" 7 means as well a deflection point, for example as a safety belt return bow.

Furthermore, a coupling flange 9 being provided at the lower end of the column 6 is of essential importance for the connection of column 6 with the vehicle floor and vehicle chassis 2, respectively. This coupling flange 9 is preferably formed as a flange plate comprising a relatively large surface being firmly connected with column 6, particularly welded, and being detachably mounted on the vehicle floor 2, in particular with a framed girder (in general a longitudinal beam 14) extending underneath, by means of bolted connections 11. Column 6 is preferably formed as a hollow section box girder and comprises an upwardly tapering cross-section. Firstly, an adaptation to the gradient of the back rest 5 is achieved by the latter characteristic as well as an especially high inherent stability against loads as they occur at the safety belt 8 and the top coupling point 7, respectively, in case of an accident. Second, due to the hollow section of the column 6 it is possible that the belt drum 8a can be inserted—as indicated—into the column 6 in a simple manner. A vertical adjustment of the safety belt may be as well provided at the top coupling point 7, as this is known from the field of passenger cars.

On fastening, the safety belt 8 may be pulled down from the top coupling point 7 of the column 6 and be inserted into the, in this case, outlying belt lock 10. The lap belt portion of the safety belt 8 leads from the belt lock 10 to the lower coupling point 17 being preferably as well arranged directly at the column 6 and in the area between seat 4 and back rest 5. However, as the lower coupling point 17 of the safety belt 8 is in general exposed to less loads than the top coupling point 7, this lower coupling point 17 of the safety belts 8 might be arranged at the frame-like bench seat frame 3 as well.

It is also of essential importance that the head rests 12 may be mounted in an especially stable manner at the column 6, here shown as horizontally extending struts which are not characterized in detail. Thus, there are no more holding devices or braces for the head rests 12 required in the back rest 5.

Another aspect is that the bench seat frame 3 may be mounted on the vehicle floor 2 independently from column 6. However, in a preferred embodiment, the bench seat frame 3 bearing the seat 4 is as well connected with the column 6, in particular bolted, as this is indicated by the schematically plotted corner straps 18 at the bottom side of the bench seat frame 3.

FIG. 3 shows a modified embodiment, with the column 6 being formed by two tubes 6 being separated from each other, instead of a spar-like profiled beam. The other component parts are equivalent to those in FIGS. 1 and 2, such that the same numerals are used hereto. The run of the three-point safety belt 8 is herewith, as indicated, the same as in FIG. 2, with a centric top coupling point 7 as to bench seat 1, a laterally outlying belt lock 10 and a lower coupling point 17 which is again centric and preferably arranged at the column 6. According to this embodiment, an additional and especially stable holding device for the head rests 12 may be created by the respective bending of the top end of the tube for the column 6. However, the horizontal portion of the tube 6 adjacent to the head rests 12 may be also elongated to a tube 6', shown in phantom lines, for increasing the stability which results in an approximately horseshoe-shaped or bow-shaped embodiment of column 6. Another aspect is that column 6', plotted in phantom lines, may also be connected to the vehicle floor 2 and framed girders, respectively, by a coupling flange 9' in a similar way to the centric arrangement of column 6. Thus, when in this case in the right area of bench seat 1 a respectively stable framed girder is available, in particular a longitudinal beam, it may be sufficient when just the column 6' is provided at the lateral edge of bench seat 1 such that the reversed safety belt run, as indicated with numeral 8', is provided emanating from a laterally outlying top coupling point 7'.

Figure 4:
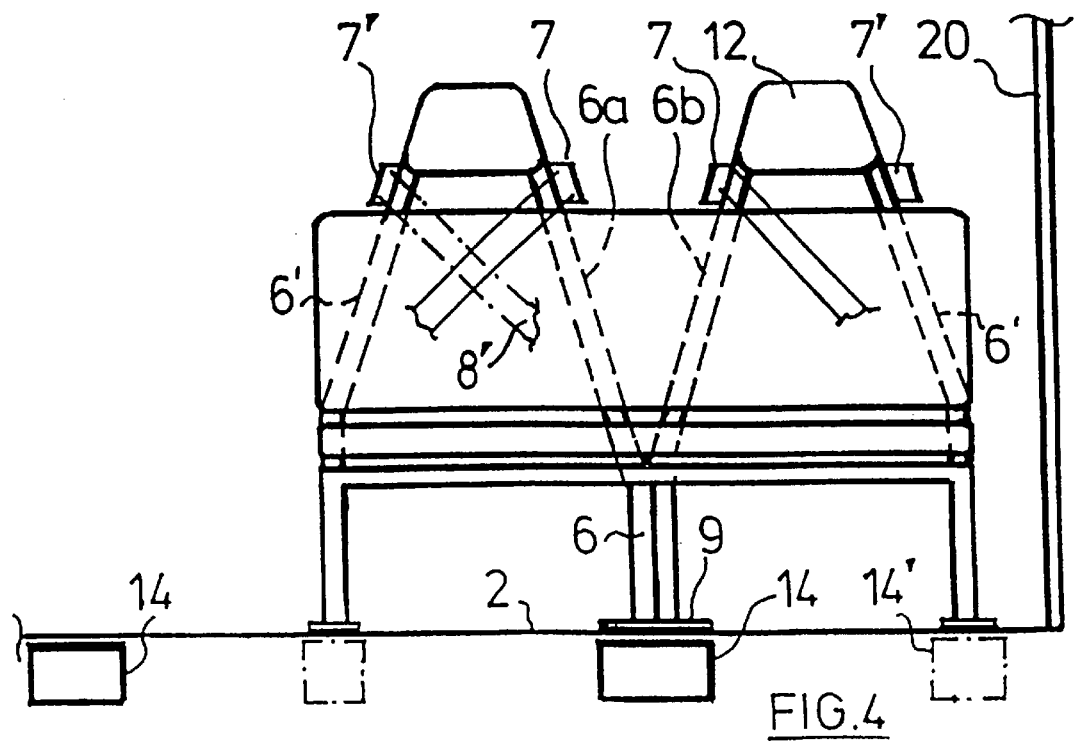
FIG. 4 a further embodiment of the bench seat showing a schematic view of the assembly situation in a camping car.

FIG. 4 shows a modified embodiment for the bow-shaped design of the column 6. With this, the column 6 being bolted to the vehicle chassis 2 by the centric coupling flange 9 branches into two sections 6a, 6b carrying again at their top ends the head rests 12 and the top coupling points 7 of the outwardly extending safety belts 8. Thereby a belt run according to FIG. 2 results, too. However, the column sections 6a and 6b may be elongated through the head rests 12 into the column portions 6' being again sloped downwardly. These may pass over into the bench seat frame 3 or, if a respective vehicle chassis or a respectively stable vehicle floor is available, be as well elongated to that place downwards and—similar to FIG. 3—be bolted with a coupling flange 9'.

For better illustration a chassis built-on 20 of a camping car is herewith indicated. This shows that the bench seat and the column 6 do not require any linking to the side panel 20 (or the body ceiling), therefore being arranged in a free-standing way such that any arrangement in lateral and lengthwise directions of the vehicle results. By this, the bench seat can be set up, for example, immediately adjacent to the side windows. In the embodiment with two longitudinal beams 14 the centric column 6 is evidently connected to the, in this case, right longitudinal beam 14 via the coupling flange 9. However, there are also known body built-ons, with which the vehicle chassis is formed by several longitudinal beams 14' (shown in phantom lines) extending side by side and at a certain distance to each other. In the latter case, it may be more convenient for the stability to arrange the coupling flanges 9 additionally at both of the outer columns 6' as this provides a better introduction of force in case of an accident.

Figure 5:
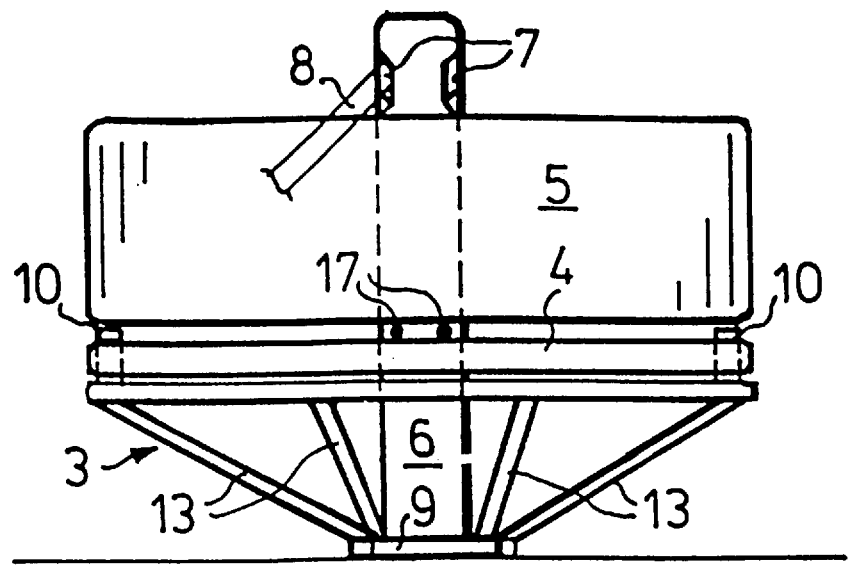
FIG. 5 an especially simple embodiment of the bench seat, in particular of the bench seat frame.

FIG. 5 shows a simplified structure of the bench seat frame 3. Herewith, several diagonal struts 13 extend basket-like or radially from the lower end of the column 6 up to the seat 4, such that no additional supports are required for the bench seat frame 3. By this, also the area underneath the bench seat 1 is especially accessible for cleaning purposes.

Figure 6:
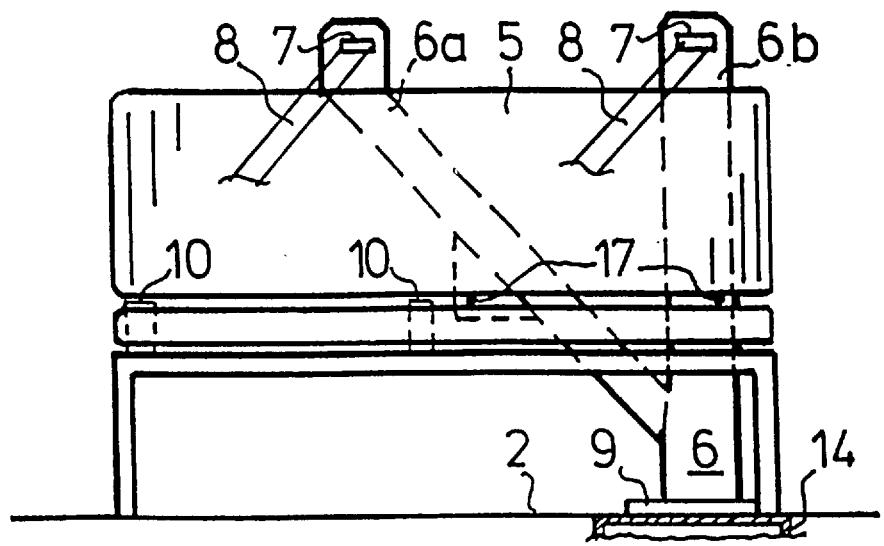
FIG. 6 a further embodiment of the bench seat showing a branching column for holding both top coupling points of the safety belts at a bench seat.

FIG. 6 shows a further embodiment of the column, with the column 6 comprising a section 6a branching, in this case, to the left side and at which the top safety belt coupling point 7 of the, in this case, left seat may be arranged. The coupling point 7 for the, in this case, right seat is thereby provided at the vertical column section 6b. Thus, a uniform run of the safety belts 8 results for both seats. It is to point out, that by this embodiment, the lower end of the column 6 comprising the coupling flange 9 may be positioned in lateral direction such that the latter is arranged exactly above the framed girder 14 in order to ensure an optimum introduction of force.

I claim:

1. Bench seat for motor vehicles, comprising a frame-like bench seat frame with seat and back rest being spaced apart from the vehicle floor for at least two persons, with the bench seat frame being arranged at one of the vehicle floor and chassis and comprising a holding device for two three-point safety belts, wherein at said back rest at least one upright, freestanding column is provided, comprising one top safety belt coupling point each at its top end area and comprising a coupling flange at its lower end for connection with said one of the vehicle floor and chassis, wherein said column is a supporting component part of said bench seat frame and wherein said bench seat frame is supported by radially extending diagonal struts emanating from said column.

2. Bench seat according to claim 1 wherein said coupling flange is formed as a flange plate being connected with said column and being detachably mounted on one of said vehicle floor and chassis by means of bolted connections.

3. Bench seat according to claim 1, wherein said column projects beyond the top edge of said back rest.

4. Bench seat according to claim 3, wherein at least one head rest is mounted at said column.

5. Bench seat according to claim 1, further including means for detachably mounting said bench seat frame to said column.

6. Bench seat according to claim 1, wherein said column is centrically arranged in the width direction of said bench seat.

7. Bench seat according to claim 1, wherein said column comprises an upwardly tapering cross-section.

8. Bench seat according to claim 7, wherein said column is formed as a hollow section box girder.

9. Bench seat according to claim 1, wherein said coupling flange of said column is directly arranged above a longitudinal beam of the vehicle.

10. Bench seat according to claim 2, wherein said flange plate is welded with said column.

11. Bench seat according to claim 2, wherein said column projects beyond the top edge of said back rest.

12. Bench seat according to claim 5, wherein said detachable mounting means comprises a bolt.

13. A bench seat and passenger restraint system for motor vehicles, comprising:
   a rigid column mounted to the vehicle;
   a flange at a lower end of said column rigidly mounted to one of the floor and chassis of said vehicle;
   a bench seat including seat and back rest portions and at least partly supported by said column, said column extending vertically above an upper edge of said back rest;
   a seat belt coupling point mounted to said column above said back rest; and
   a seat belt extendible from said coupling point to provide a shoulder-style restraint for a passenger on said bench seat wherein said bench seat is partially supported by radially extending diagonal struts emanating from a lower portion of said column.

14. The system of claim 13, wherein said flange is bolt-mounted to one of said floor and chassis.

15. The system of claim 13, wherein said column comprises an upwardly narrowing hollow box-girder.

16. The system of claim 13, wherein said column is centrally located across the width dimension of said bench seat and said system includes a second coupling point and second seat belt for a second passenger.

17. The system of claim 13, further including a head rest attached to said column above said back rest.

* * * * *

UNITED STATES PATENT AND TRADEMARK OFFICE
CERTIFICATE OF CORRECTION

PATENT NO. : 5,868,452
DATED : Feb. 9, 1999
INVENTOR(S) : Grieger, Andreas

It is certified that error appears in the above-identified patent and that said Letters Patent is hereby corrected as shown below:

On the title page, after [73] Assignee: Please correct "AQUTI PRODUKTENTWICKLUNG & DESIGN"

to read: --AGUTI PRODUKTENTWICKLUNG & DESIGN--

Signed and Sealed this

Tenth Day of August, 1999

Attest:

Q. TODD DICKINSON

Attesting Officer

Acting Commissioner of Patents and Trademarks